Sept. 10, 1935.  B. S. FLORADAY  2,014,173
BRAKE MECHANISM
Original Filed March 25, 1926  4 Sheets-Sheet 1
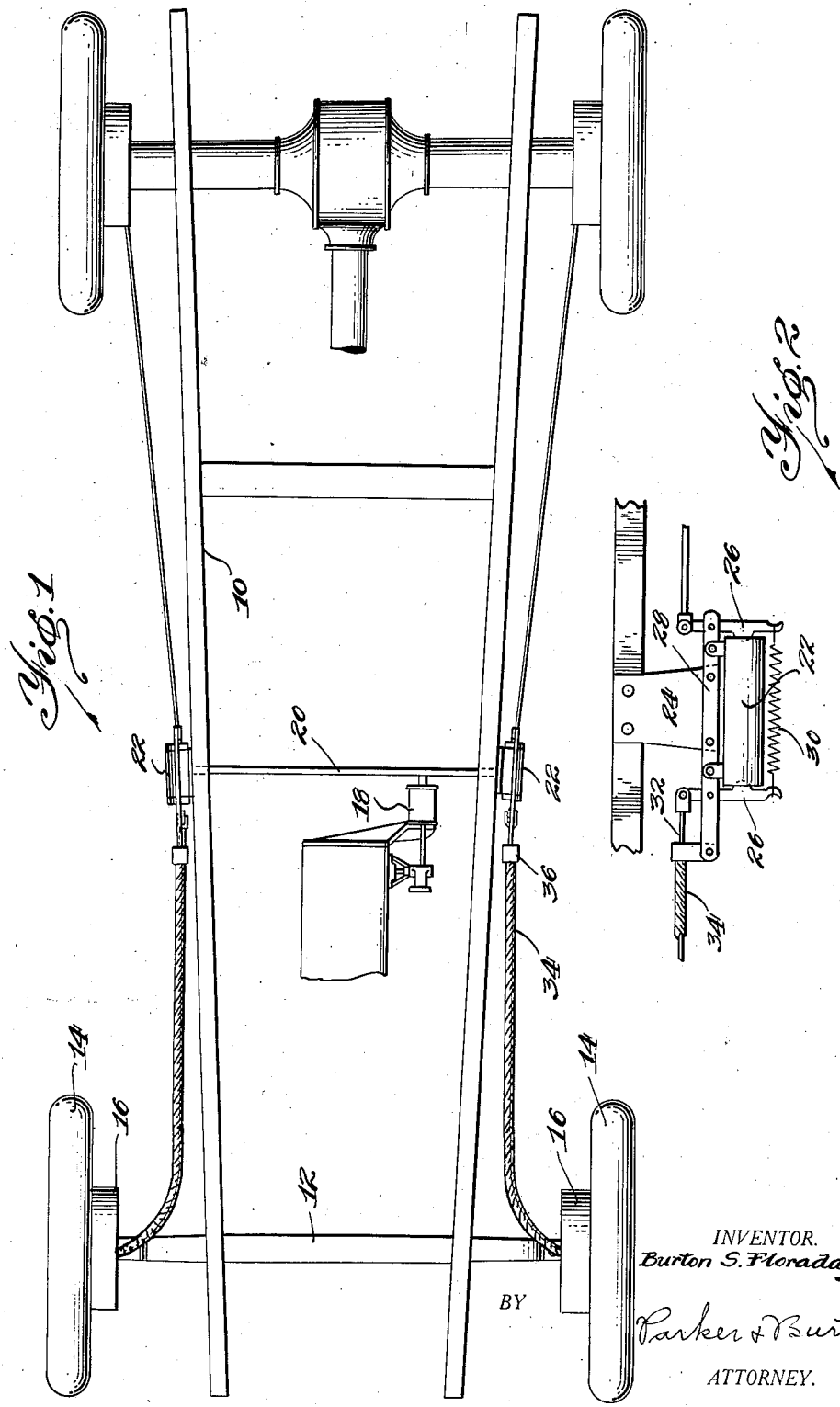
INVENTOR.
Burton S. Floraday
BY
Parker & Burton
ATTORNEY.

Sept. 10, 1935.  B. S. FLORADAY  2,014,173
BRAKE MECHANISM
Original Filed March 25, 1926   4 Sheets-Sheet 2
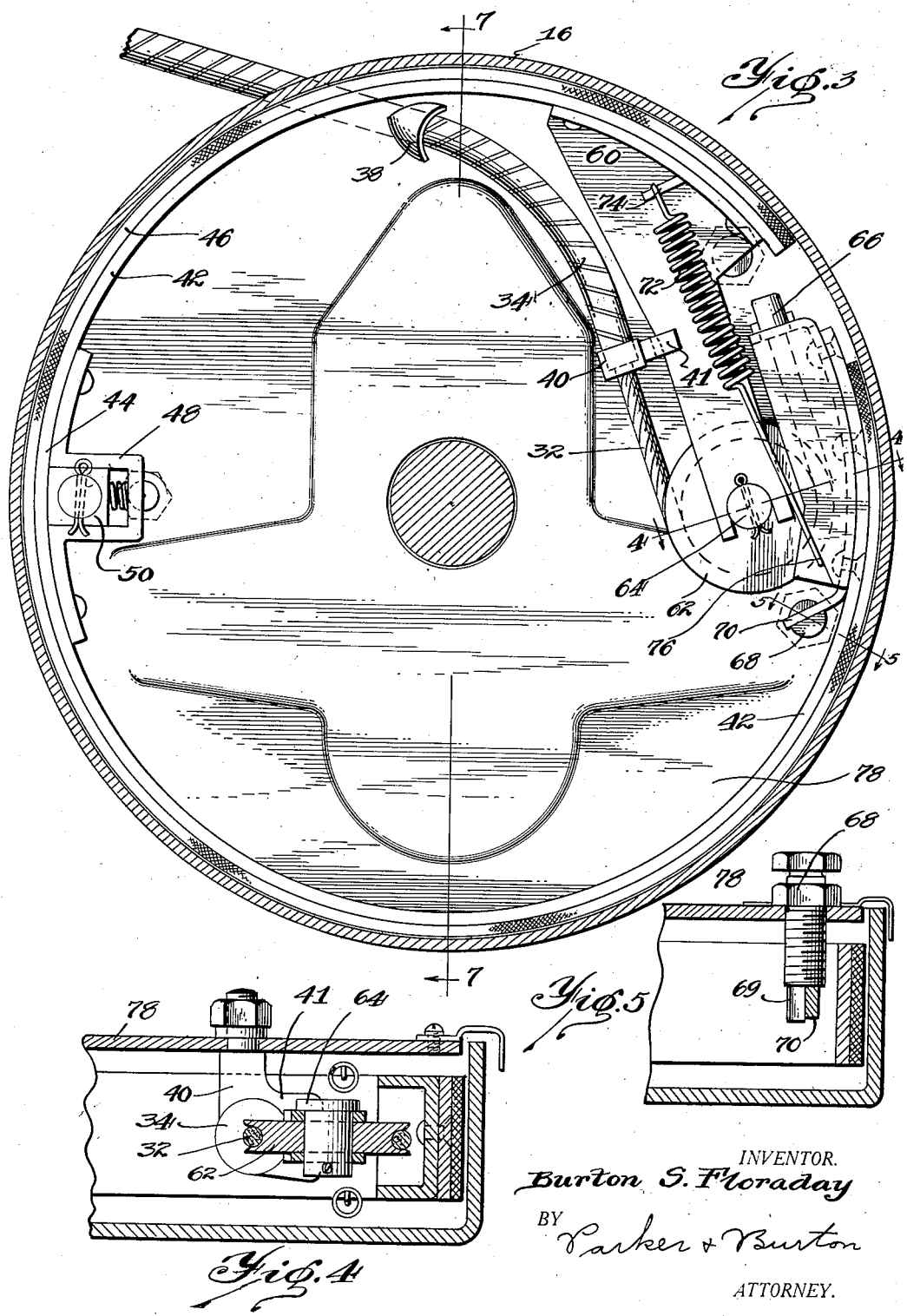
INVENTOR.
Burton S. Floraday
BY Parker & Burton
ATTORNEY.

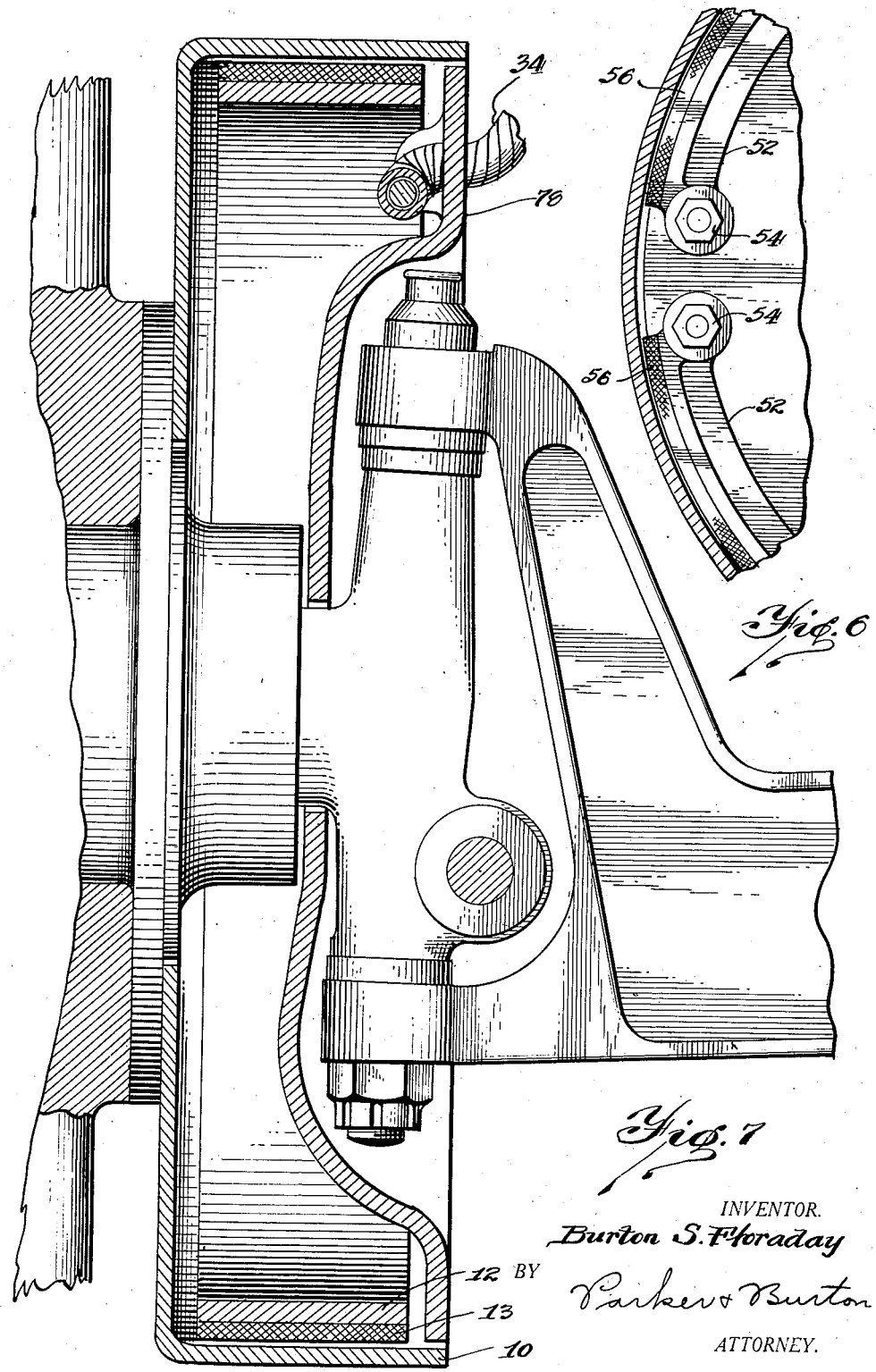

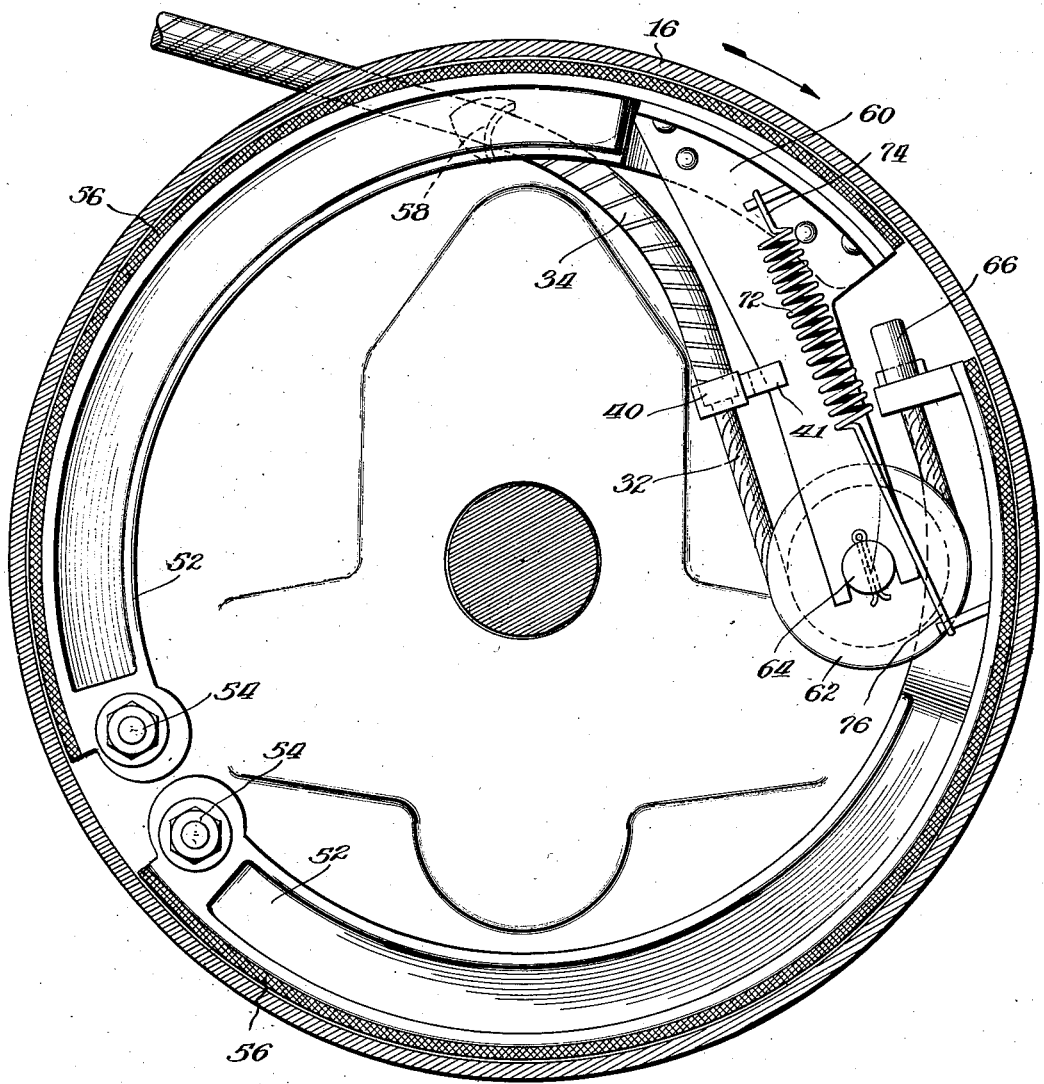

Patented Sept. 10, 1935

2,014,173

UNITED STATES PATENT OFFICE 2,014,173

BRAKE MECHANISM

Burton S. Floraday, Toledo, Ohio, assignor to Hydraulic Brake Company, Detroit, Mich., a corporation of California Application March 25, 1926, Serial No. 97,207
Renewed March 26, 1932

16 Claims. (Cl. 188—78)

My invention relates to improvements in brake mechanism and is particularly adapted for use in connection with vehicle brake mechanism of the character herein illustrated.

An object is to provide in brake mechanism having an external drum and internal expansible brake segments such as a split band, a flexible connection or cable extending into the drum and secured directly to the brake band to actuate the same. In brake mechanism of the split band or rigid segment type the cable is preferably secured to one end of the band and travels over a guide supported from the opposite end of the band, which guide is so supported that the cable exerts a force on the two brake segments or ends of the band, which forces are opposite and substantially parallel and tangential to the periphery of the brake drum.

My improved construction is such that notwithstanding wear of the parts and particularly the braking surface and even after adjustment to compensate for such wear, the forces exerted on the brake segments remain substantially parallel and never approximate a radial direction with respect to the drum. Thereby my apparatus always functions in substantially the same fashion and the brake surfaces are brought into contact with the drum evenly and with a uniform application of pressure.

In the drawings,—

Figure 1 is a plan view of a vehicle frame provided with my improved mechanism.

Fig. 2 is a side elevation of one of the working cylinders.

Fig. 3 is a vertical sectional view through the brake mechanism of one of the front wheels.

Fig. 4 is a sectional view taken on line 4—4, Fig. 3.

Fig. 5 is a sectional view taken on line 5—5, Fig. 3.

Fig. 6 is a vertical sectional view taken on the same line as Fig. 3, showing rigid brake segments instead of a flexible brake band.

Fig. 7 is a sectional view taken on line 7—7 of Fig. 3, and

Fig. 8 is a sectional view illustrating a brake mechanism employing rigid brake segments.

In the drawings I have shown my improvement as employed in connection with operating mechanism of the fluid pressure type. The frame of the vehicle is indicated as 10. It is provided with a front axle 12 carrying the usual steering knuckles on which are mounted the road wheels 14 each having a brake drum 16. There is a master cylinder 18 which communicates through a conduit 20 with each of a pair of working cylinders 22. Each working cylinder is shown as supported from a side frame member by a bracket 24. A piston is mounted in each end of the working cylinder 22 and an operating lever 26 is pivoted to a support 28 at each end of the cylinder, which operating lever is adapted to be actuated by the adjacent piston. These operating levers are held toward each other by a spring 30. A flexible cable 32 extends through a flexible conduit 34 to the brake operating mechanism within the drum and is connected directly therewith to actuate the same. The flexible conduit is supported at one end as at 36 and extends through an opening 38 in the brake carrier 78 to a bracket 40 which supports the opposite end of the conduit. The bracket 40 is rigidly attached to the brake carrier 78, as clearly shown in Fig. 4. This flexible conduit is of the usual construction and serves as a guide for the cable or flexible connection 32 that extends through the conduit.

In Fig. 3, I have shown a band 42 mounted inside the drum suitably supported at 44 and split on the opposite side, which band carries a friction face 46 adapted to impinge the interior of the drum. The support for the band here shown is in the form of a saddle 48 that rides over a supporting bearing 50 which permits movement of the band at the bearing support.

In Fig. 6, I have shown a pair of rigid segments 52 mounted at 54 for swinging movement. The segments are provided with friction faces 56. Either flexible bands or rigid segments are used as interior brake members. The segments have free ends which are held yieldingly toward each other by a spring member, not shown in the drawings, which operates in a manner similar to the spring member 72 shown in Fig. 3 in connection with which I will particularly describe my invention.

One end of the band carries a double bracket 60. A pulley or sheave 62 is mounted upon a pin 64 in the outer end of the bracket members 60 and serves as a guide for the cable 32 which travels thereover. The cable is looped or doubled back over the pulley and connected at 66 to the opposite end of the band 42. I have shown an adjustment of standard construction for the cable connection which comprises an adjusting screw 68 having a cam face at one end as at 69 and the cable connection has an extension 70 which is engaged by such cam face, whereby the connection may be moved longitudinally of the band to adjust the same with respect thereto.

A spring 72 is connected at 74 to one end of the band and at 76 to the opposite end, holding the two ends of the band yieldingly toward each other to contract the band within the drum. The arm 40 is forked at 41 and engages over the bracket 60 so as to hold the cable in alinement therewith. The bracket 60 is so positioned that the guide or pulley 62 overhangs that end of the band to which the cable is connected so that when the cable is withdrawn outwardly a force is exerted on the end of the band to which the cable is connected through its connection therewith and on the opposite end of the band through the cable passing over the pulley 62 which forces the band against the drum. These forces exerted by the cable on the two ends of the band are substantially parallel at any point in the operation of the mechanism and are tangential to the drum face.

As brake mechanism is used the friction surface wears and adjustment is required to compensate for this wear. In my improved construction notwithstanding the adjustment which may occur to compensate for wear and notwithstanding wear, the pressures exerted by the cable on the brake segments or on the two ends of the band which are hereinafter frequently referred to as brake segments, the ends of the band and the brake segments being used interchangeably, are substantially equal and one pressure is exerted on a line substantially parallel to the other due to this construction. The braking force exerted by the brake segments or the two ends of the band is substantially uniform at all times and the direction of pressure as the braking force is applied does not change appreciably during such application but continues in the same direction as originally instituted.

The term "segment" as used in the accompanying claims is a generic expression meaning a portion of a circle. It covers both the flexible band shown in Fig. 3 and the rigid segment shown in Fig. 6.

What I claim is:

1. In brake mechanism, a brake drum, separated internal brake segments within the drum, means for expanding said segments outwardly against the drum consisting of a cable connected to one brake segment, and a cable guide supported by the other segment over which the cable travels in expanding the segments.

2. In brake mechanism, a brake drum, a pair of brake segments positioned within the drum having opposed separated ends held yieldingly toward each other, a cable extending into the drum and connected with one brake segment at the gap, and a cable guide supported from the opposite end of the other brake segment to overhang said gap and the brake segment to which the cable is connected, said cable extending over said guide.

3. In brake mechanism, a brake drum, a pair of brake segments having separated free ends held yieldingly toward each other, a cable guide supported by one brake segment to overhang the other, and a cable extending into the drum and over said guide, said cable doubled backwardly substantially parallel said overhanging guide and connected with the opposite brake segment.

4. In brake mechanism, a brake drum, separated internal brake segments, a cable extending into the drum and connected with one segment, a guide over which the cable travels so supported from the opposite segment that when the cable is drawn outwardly it exerts a force on the segment to which it is connected substantially parallel to the force it exerts on the opposite segment through the guide.

5. In brake mechanism, an external drum, separated brake segments therein adapted to be expanded against the drum, a cable extending into the drum connected with one segment, and a cable guide supported from the other segment over which the cable travels, said cable adapted when drawn outwardly to exert a force on the segment to which it is connected and on the segment that supports the guide over which it travels to force said segments outwardly against the drum.

6. In brake mechanism, a drum, a pair of brake segments within the drum, a cable extending into the drum connected with one segment, a guide supported by the other segment to overhang that segment to which the cable is connected, said cable looped over said guide whereby when drawn outwardly it exerts a pressure on one segment through its connection therewith and on the other segment through the guide over which it travels, which pressures so exerted are tangential the brake drum.

7. In brake mechanism, an external drum, internal separated brake segments, a cable extending into the drum and connected with a segment and having a slidable engagement thereover to force the segments apart and outwardly toward the drum.

8. In brake mechanism, a brake drum, brake segments within the drum, a flexible conduit extending from a support outside the drum to a point within the drum, a cable extending through said conduit, said cable connected with one brake segment, and a guide supported by the opposite brake segment and over which the cable travels, that portion of the cable extending beyond the conduit being looped over said guide.

9. In a vehicle, a front axle, a steering knuckle, a wheel mounted thereon provided with a brake drum, a flexible conduit extending to a point within the drum and fastened externally thereof to a part of the vehicle, a cable extending through said conduit, separated brake segments within the drum, said cable connected with one of said brake segments, and a guide supported from the opposite brake segment over which the cable travels.

10. In brake mechanism, a brake drum, brake members mounted within the drum, and a flexible connection extending into the drum connected directly with said brake members to operate the same.

11. In a brake mechanism, a brake drum, brake lining, expansible means for supporting the brake lining within the drum for moving the brake lining into engagement with the drum, said expansible supporting means having two adjacent free ends, and means including a cable, and a pulley associated with one free end of the expansible means, for applying force to the said free ends when the cable is drawn, one free end receiving twice the force received by the other end.

12. In a brake mechanism, a drum, a housing, a plurality of segments, at least one of which has a floating end, means for urging this end normally away from said drum, a movable element mounted on a second segment, and a cable extending in the housing having its end connected to said first segment and trained over said movable element whereby the floating end of the first element is urged away from the second element and into frictional engagement with said drum.

13. In a brake mechanism for a vehicle, a drum, friction surfaces mounted for engagement with said drum, a flexible member secured directly to said friction surfaces for engaging said surfaces with the drum, and a constant length conduit attached to a part stationary relative to the vehicle and extending into the drum, the end extending into the drum being attached within the drum to a part stationary relative to the drum.

14. In brake mechanism, a brake drum, a brake band therein adapted to be expanded outwardly against the drum, a flexible cable fastened to one end of the band, and a pulley mounted on the opposite end of the band and over which the cable travels in expanding the band.

15. In brake mechanism, a brake drum, a brake band therein, a cable guide supported by one end of the band to overhang the opposite end, and a cable extending over said guide and doubled back upon itself and secured to the opposite end of the band.

16. In brake mechanism, a brake drum, a brake band within the drum, a pulley supported from one end of the band to overhang the opposite end, and a cable extending over said pulley and secured to the opposite end of the band intermediate the pulley and the end of the band which supports the pulley.

BURTON S. FLORADAY.